Feb. 16, 1965   O. A. BEECK   3,169,806
ROLLER MOUNTED EXTENSION SLIDES
Filed April 5, 1961
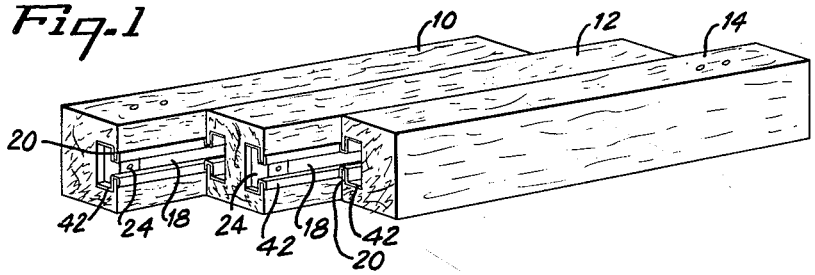
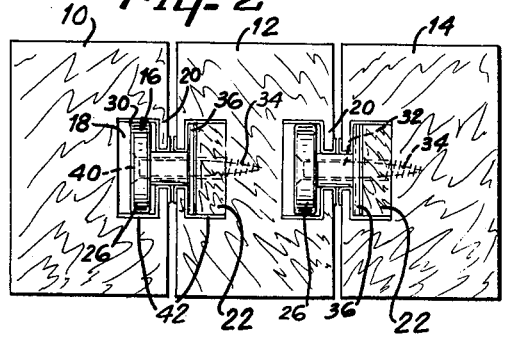
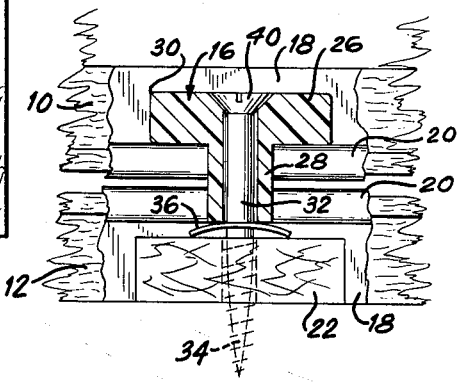
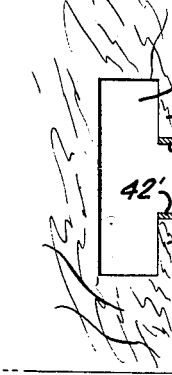
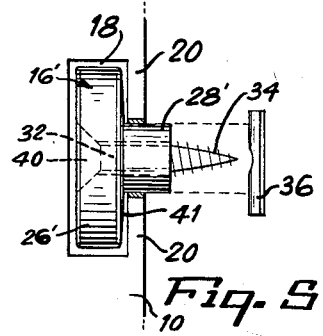
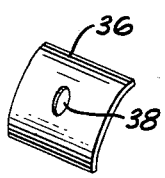
INVENTOR.
OTTO A. BEECK
BY
Howard Myles Schwingen
ATTORNEY United States Patent Office 3,169,806
Patented Feb. 16, 1965

3,169,806
ROLLER MOUNTED EXTENSION SLIDES
Otto A. Beeck, 158 Jericho Turnpike, Floral Park, N.Y.
Filed Apr. 5, 1961, Ser. No. 100,857
7 Claims. (Cl. 308—3.8)

This invention relates to roller mounted extension slides and more particularly, to a roller mounted extension slide for an extension table. This application is a continuation in part of United States patent application Serial Number 43,115 filed July 15, 1960, now U.S. Patent No. 3,078,130 issued February 19, 1963.

In the related co-pending application there was described an extension slide whose slide components were mounted on rollers in lieu of the conventional dovetailed wooden connector which caused the slide to be subject to mechanical failure and adversely affected by temperature and humidity. This improvement was particularly noteworthy in connection with slides for extension tables where a long wearing and smooth operating slide is of critical importance.

It was found, however, that the very advantageous rollers created certain distinct problems of their own, particularly with respect to the positioning and mounting of the rollers and their subsequent adjustment on the slide. The problem of correctly positioning the roller becomes more acute wtih the adoption of so-called mass production assembly line techniques as minor dimensional variations between like components, such as the supporting roller block, show up critically with the adoption of such techniques. Minor dimensional variations in the block which supports the rollers are enough to cause the malfunction of the rollers and perhaps prevent the slide from being properly assembled with respect to the rollers.

It is therefore amongst the primary objects of the present invention to provide a roller mounted extension slide whose rollers are readily mountable and adjustable.

It is another important object of the present invention to provide a roller mounted extension slide whose rollers may readily be placed under equal tension during the mounting thereof.

It is still another important object of the present invention to provide a roller mounted extension slide where friction between roller and slide is held to a minimum and additionally, where there is no binding of the rollers because of spacer failure as occurs with conventional washers when, under conditions of stress and strain, they embed themselves in the body of the slide.

It is still a further object of the present invention to provide, in a roller mounted extension slide, roller adjustment means for readily compensating for minor dimensional variations between individual slides.

It is yet a further object of the present invention to provide a roller mounted extension slide which lends itself to so-called mass production assembly line techniques.

How these and other objects are accomplished and new results are obtained will be apparent from what is described in the following specification, particularly pointed out in the claims, and illustrated in the accompanying drawing wherein:

FIG. 1 is a perspective view of an extension slide in accordance with the present invention, FIG. 2 is an end view thereof, FIG. 3 is a sectional view of a portion of the slide of FIGS. 1 and 2 showing a roller and its mounting on the slide, FIG. 4 is an end view of a modified slide component showing its channel and protective channel liner;

FIG. 5 is an exploded view of a modified roller and associated components in accordance with the present invention;

FIG. 6 shows another form of roller arrangement in accordance with the present invention; and FIG. 7 is a perspective view showing a means, in accordance with the present invention, for biasing the rollers.

Referring now to the drawing, a table slide in accordance with the present invention is shown in FIG. 1 consisting of lateral beams 10 and 14 slidably mounted on either side of central beam 12 for movement longitudinally thereof.

In this particular embodiment of the invention, beams 10, 12 and 14 are of wood, as is conventional with table slides, the slide being adapted for use with an extension table that has two permanent top sections and one or more supplemental top sections. The supplemental top sections are adapted to be positioned between the permanent sections when the table is fully or partly opened.

In actual practice, an extension table is provided with two such slides to insure balanced support of the top sections. Each of said slides is affixed to one of the permanent table top sections by one of its lateral members and to the other of said permanent top sections by its other lateral member. An extension table utilizing such slides has been omitted from the drawing so as not to unduly encumber the same.

It should be realized that although the extension slide herein disclosed is best illustrated with respect to extension tables, the invention is not so limited being applicable to situations wherein two members are slidably interconnected by a third member disposed therebetween. Additionally, the invention is not restricted merely to the three beam slide shown, the number of beams being chosen with respect to contemplated use.

The desired sliding action between slide beams is achieved by mounting rollers 16 on their opposing faces and forming channels 18 in said beams to accommodate said rollers. Each channel is provided with flanges 20 to retain its respective roller therein and lock the slide beams together. As shown in FIGS. 1 and 2, each channel 18 is provided with a liner 42 covering the channel wall and also covering the roller bearing edges of the flanges 20. The enlarged head 26 of roller 16 is in rolling contact with the upper and lower walls of liner 42, as shown in FIG. 2.

In the embodiment of FIG. 1, a roller is provided for each opposing face of the slide beams and arranged so that when the slide is closed the rollers are positioned near the ends of the slide. Rollers 16 and their supporting blocks 22 prevent the slide beams from disengaging each other by acting as an extension stop. Wooden inserts 24 are mounted at the ends of the channels to limit the advance of the slide beams in the retraction direction.

The rollers may be of a one or a two piece construction depending upon cost consideration and the durability and operation required of the slide. In FIGS. 1 through 5, a one piece roller is shown whereas in FIG. 6 a two piece roller in accordance with the present invention is presented. The roller of FIGS. 1 through 5 is provided with an enlarged head 26 which rides within channel 18. Head 26 extends from a neck 28 of smaller diameter which rides the edges of flanges 20. The edges of roller 16 are chamfered as at 30 to eliminate sharp edges which can bite into the channel wall and cause the impedance of roller action.

A block 22, positioned at the channel ends, is utilized in the mounting of the rollers. Each roller is rotatably mounted on a rod 32 having a screw end 34. The rollers and their supporting blocks 22 are affixed to the slide by means of this rod, as shown in the drawing.

An arcuate disc 36 is positioned between each block 22 and the roller end adjacent to it. Said discs are centrally apertured, as at 38, for mounting on rod 32, as are the rollers. The discs are of a resilient metallic composition and rectangular in plan, as shown in FIG. 7.

As stated heretofore, the rollers are mounted on the slide by screwing rod 32 by its roller retaining screw head 40 into the body of the slide. If the rollers are screwed too tightly to the slide, there will be difficulty in turning the same. Conversely, if the rollers are not affixed tightly enough, they will be wobbly and loose and generally unsatisfactory for good slide operation. Furthermore, it is important that the tension or pressure that each roller is under on an individual slide be equal. Heretofore, this could only be accomplished by trial and error which necessitated endless adjustments and complicated quantity production.

By reason of resilient disc 36 this difficulty is overcome. Now the assembler only has to screw the rod securely into the slide and then release the rod somewhat to obtain the desired tension, the biasing effect of disc 36 simplifying the adjustment of rollers to slide. Additionally, by virtue of the configuration of the disc, friction is significantly reduced and the likelihood of imbedding the disc into the body of the slide is practically eliminated. This was not the case with the conventional spacer washer which tended to bind the roller. Furthermore, the resilient discs can be made to compensate for minor variations in the thickness of the supporting blocks. Heretofore, such variations prevented the accurate positioning of rollers with respect to the channels.

In FIG. 5, a modified one piece roller is shown having its head dimensioned so that it serves only to interlock the slide beams. This roller is generally designated by numeral 16'. The head 26' of this roller does not have a bearing function and does not come into contact with the wall of the channel. To this end, the flange opposing face 41 of roller head 26' is tapered to reduce the chances of physical contact with flanges 20 to a minimum.

With this form of roller, only the roller bearing edges of flanges 20 need be provided with a liner, designated 42' in the drawing. Such liner may be of a durable plastic composition and bonded to the slide. The liner 42 for the channels of the preceding embodiment is, of course, more extensive, covering not only the roller bearing edges of the flanges but also the bearing supporting portions of the channel wall. This liner is preferably of metal and is bolted to the slide. Both types of liner need not extend the full length of the channel but need only extend along that portion of the channel and/or flanges on which the roller rides.

In FIG. 6 a two piece roller in accordance with the present invention is shown in a slide where the channels are completely lined with a metallic liner 42" of special configuration; this special configuration liner is described in detail in my aforementioned parent application, Serial No. 43,115, now U.S. Patent No. 3,078,130. The portion of this roller assemblage analogous to the above described roller head is now designated as primary roller 26" and is completely spaced from the remainder of the roller assemblage which is designated secondary roller 28". This particular form of roller assemblage and cooperating channels makes for a particularly easy operating, well balanced and durable slide.

It is to be understood that the invention is not confined to the particular forms or uses herein shown, the same being merely illustrative, and that the invention may be carried out in other ways without departing from the spirit thereof and, therefore, the right is broadly claimed to employ all equivalent instrumentalities coming within the scope of the appended claims and by means of which the objects of the invention are attained and new results accomplished, as it should be apparent that the particular embodiments herein shown and described are only some of the many that can be employed to attain these objects and accomplish these results.

What is claimed as new and desired to be secured by Letters Patent is:

1. A slide comprising two juxtapositioned members arranged slidably with respect to each other, a channel formed in one of the opposing faces of said members, a centrally apertured roller mounted for rotation extending from the other of said members, said roller riding in said channel to slidably interlock said members together, a centrally apertured resilient dished spacer mounted between said roller and the member from which it extends, said roller and said spacer being mounted on a rod having a screw end and a roller retaining screw head, said spacer abutting the roller and the said member and cooperating with said roller retaining screw head to exert a clamping pressure on said roller.

2. A slide comprising two juxtapositioned members arranged slidably with respect to each other, a channel formed in one of said members, said channel being provided with a flange, a centrally apertured two stage roller assemblage mounted for rotation and extending from the other of said members, one stage riding in said channel to slidably interlock said members together, the other stage riding on the said flange, a centrally apertured resilient dished spacer mounted between said roller assemblage and the member from which it extends, said roller and said spacer being mounted on a rod having a screw end and a roller retaining screw head, said spacer abutting the roller assemblage and the said member and cooperating with said roller retaining screw head to exert a clamping pressure on the roller arrangement.

3. A slide as defined in claim 2 wherein said spacer is of a substantially rectangular configuration.

4. A slide comprising two juxtapositioned members arranged slidably with respect to each other, channels formed in opposing faces of said members, said channels being provided with flanges, each of said members being provided with a centrally apertured two stage roller assemblage mounted for rotation, one of the two stages of each of the roller assemblage being channel confined to slidably interlock said members together, the other stage of each of the roller assemblage riding on the channel flanges, a centrally apertured resilient dished spacer mounted between each roller arrangement and the member from which it extends, each said roller assemblage and dished spacer being mounted on a rod having a screw end and a roller retaining screw head, said spacer abutting the roller arrangement and the said member and cooperating with said roller retaining screw head to exert a clamping pressure on the roller arrangement.

5. A slide comprising two juxtapositioned members arranged slidably with respect to each other, channels formed in opposing faces of said members, a centrally apertured roller assemblage rotatably carried by each of said members, each roller assemblage comprising a channel mounted primary roller with a juxtapositioned secondary roller, each channel being provided with a pair of opposed flanges for retaining its primary roller therein and slidably interlocking said members together, said secondary roller bearing upon the flanges of opposing channels, a centrally apertured resilient dished spacer mounted between each roller assemblage and the member from which it extends, each said roller assemblage and dished spacer being mounted on a rod having a screw end and a roller retaining screw head, said spacer abutting the roller assemblage and the said member and cooperating with said roller retaining screw head to exert a clamping pressure on the roller assemblage.

6. A slide comprising two juxtapositioned members arranged slidably with respect to each other, channels formed in opposing faces of said members, a one piece centrally apertured roller rotatably carried by each of said members, each said roller including a channel mounted head extending from a body portion of lesser diameter, each channel being provided with opposing flanges for retaining said head therein thus slidably interlocking said members together, said body portion bearing upon the flanges of opposing channels, a centrally apertured resilient dished spacer mounted between said roller and the member from which it extends, each said roller and said spacer being mounted on a rod having a screw end and a roller retaining screw head, said spacer abutting the roller and the said member and cooperating with said roller retaining screw head to exert a clamping pressure on the roller.

7. A slide as defined in claim 6 wherein the flange opposing face of each roller is tapered.

References Cited by the Examiner
UNITED STATES PATENTS

| | | | |
|---|---|---|---|
| 176,816 | 5/76 | Snyder | 311—70 |
| 352,114 | 11/86 | Bugbee | 311—70 |
| 540,483 | 6/95 | Comstock | 311—70 |
| 626,747 | 6/99 | Boardman | 311—70 |
| 1,577,063 | 3/26 | Drew | 311—70 |
| 2,872,261 | 2/59 | Dobbratz et al. | 311—71 |
| 2,886,095 | 5/59 | Heyl | 308—6 X |

FRANK SUSKO, *Primary Examiner.*

GEORGE L. BREHM, ROBERT C. RIORDON, *Examiners.*